Whitelaw & Stirrat.
Water Wheel.
№ 3,153.  Patented July 3, 1843.
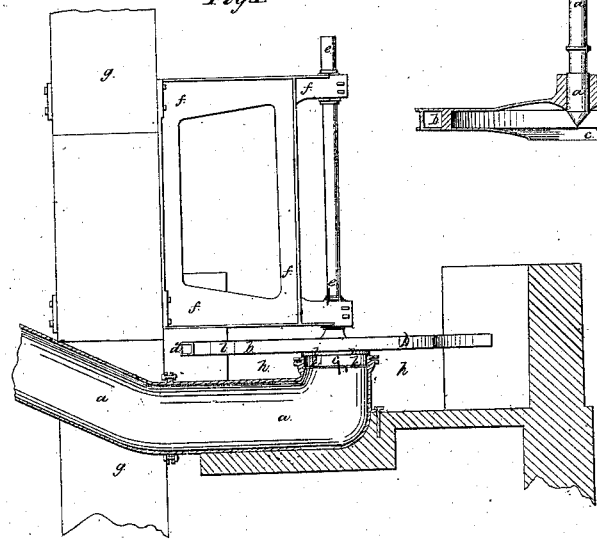
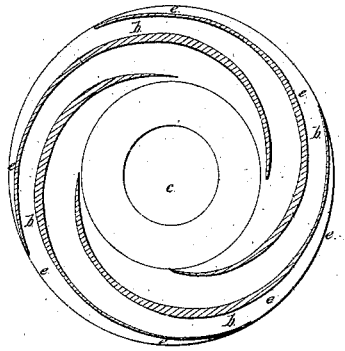
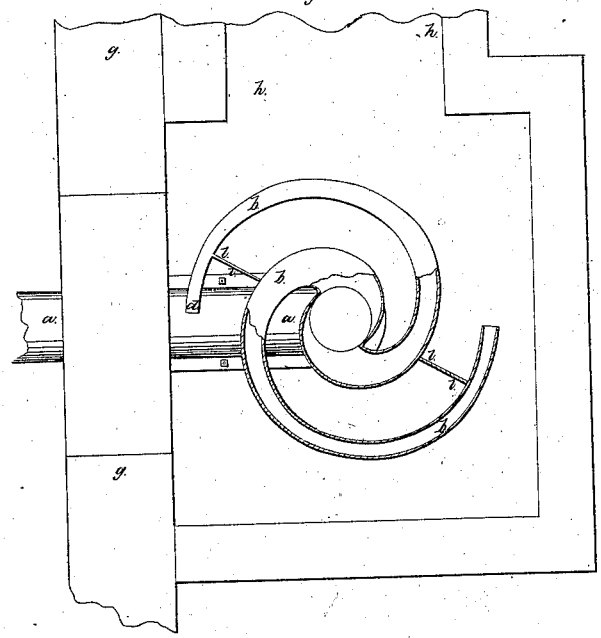
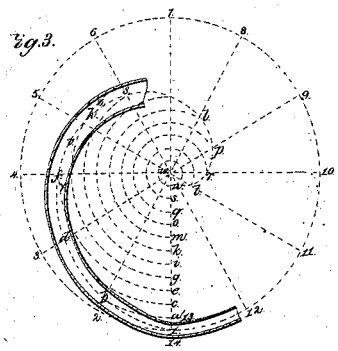
Witnesses
John Campbell
Dougald Turner
Inventors
James Whitelaw
James Stirrat

UNITED STATES PATENT OFFICE.

JAMES WHITELAW AND JAMES STIRRAT, OF PAISLEY, ENGLAND, ASSIGNORS TO JAMES FINLAY, OF NEW YORK, N. Y.

IMPROVEMENT IN WATER-WHEELS.

Specification forming part of Letters Patent No. 3,153, dated July 3, 1843.

*To all whom it may concern:*

Be it known that we, JAMES WHITELAW, engineer, and JAMES STIRRAT, manufacturer, both of Paisley, in the county of Renfrew, North Britain, have invented Improvements in Rotary Machines to be Worked by Water; and we do hereby declare that the following is a full and exact description of the same, reference being made to the accompanying drawings.

Figure 1 is an elevation, and Fig. 2 a plan, of the first of our improved rotary machines to be worked by water.

In these figures the same letters point out the same parts.

The main pipe $a\,a$ conducts the water which drives the machine into its arms from a reservoir or head on a higher level than the arms.

$b\,b\,b\,b$ are the arms, which are hollow. The water passes into them at the center part $c$, and escapes at the jet-pipes $d\,d$. The motion of the arms is communicated to $e\,e$, the main or driving shaft of the machine, and by means of a wheel-pinion or pulley fixed on the shaft $e\,e$ its rotary motion may be communicated to any machinery which the water-mill may be intended to work.

$f\,f\,f\,f$ is a large bracket which is fixed to the wall or building $g\,g$. This bracket supports the shaft $e\,e$. The tail-race is marked $h\,h$. As the arms have a rotary motion, and the pipe $a\,a$ is fixed to the building under the machine, there must be means provided to prevent the escape of water at the place where the main pipe meets the arms. A contrivance suitable for this purpose is shown at Fig. 1. It consists of a ring $i\,i$ round the under side of $c$, the central opening or aperture leading into the arms, and of a part $k\,k$, turned cylindrical at the place where it fits into the bored part on the top of the pipe $a\,a$. The part $k\,k$ has a groove or grooves turned round its outside near to its bottom end. The groove or grooves is or are to be wrapped full of soft twine or other like material to prevent the escape of water between the pipe and the cylindrical part of $k\,k$. There is a flange outside of the part $k\,k$, and rope-yarn is wrapped round in the space between this flange and the top of the pipe for the purpose of keeping the top of $k\,k$ in contact with the bottom of the ring $i\,i$. The ring $i\,i$ is not sectioned in Fig. 1, but the other parts of the water-tight joint and the main pipe are represented in section in this figure. It will be clear that if the ring $i\,i$ and the part $k\,k$ be accurately turned and ground upon each other at the place where they meet the rope-yarn in the space between the flange outside of $k\,k$ and the top of the main pipe will press the part $k\,k$ into contact with $i\,i$, and in this way keep the joining of these parts water-tight.

We will now explain the manner of forming the arms of the machine, as shown in Figs. 1 and 2.

In the diagram Fig. 3, let 1 4 9 be a circle of the same diameter as that described by the center of the jet-pipes, and let this circle be divided into, say, twelve equal parts in the points 1, 2, 3, 4, 5, 6, 7, 8, 9, 10, 11, and 12, and let the radius 1 $w$ be also divided into twelve equal parts in the points $a$, $c$, $e$, $g$, $i$, $k$, $m$, $o$, $q$, $s$, and $w$. From each division on the circle draw a straight line to the center $w$, and from the division at $a$ on the radius draw from the center $w$ a portion of a circle till it cuts the radius 2 $w$ in the point $b$. From the same center $w$ draw a portion of a circle through the second point $c$ till it cuts the radius 3 $w$ in the point $d$. In this way continue to draw concentric arcs from the divisions on the radius 1 $w$, making each concentric arc to terminate in that radius immediately following the radius in which the arc formerly drawn was made to terminate. The points of intersection 1, $b$, $d$, $f$, $h$, $j$, $l$, $n$, $p$, $r$, $t$, $w$, and $u$ thus obtained will be points in the middle of the breadth of the arm, and a curve line traced through these points will be the curve of the middle of the breadth of the arm. After the curve line 1 $d\,l\,r\,w$ is formed any number of points in the curve lines which form the sides of the arms will be obtained in the following way: With $w$ as a center, draw such a number of concentric circular arcs passing through the curve line 1 $d\,l\,r\,w$ as may give a sufficient number of the required points. Then with a pair of compasses take a distance equal to four times the width of the outer end of the jet-pipe and set off that distance upon each such concentric arc twice, measuring once upon each side of the curve 1 $d\,l\,r\,w$ from the point of intersection of the arc and that curve. The points so marked off on one side of the curve line 1 d l r w are points in one side of the arm, and the points similarly marked on the other side of this curve are points in the curve which form the other side of the arm, and the curves drawn or traced through these points are the curves forming the sides of the arm. Thus the breadth of the arm opposite the point v is found by drawing the circular arc x z through this point and measuring off from v to x on the one side of the curve line running through the middle of the arm, and from v to z on the other side of that curve a distance equal to four times the width of the jet-pipe, and in the same way the breadth of the arm at any other point will be found. If the arm be drawn in the manner now described, its depth, as also that of its jet-piece, will be uniform throughout. In Fig. 1 the width of the arms and jet-pieces are thus represented. The width of each jet-pipe being, as before mentioned, one-fourth of the length of the chord subtending the circular arcs which determine the width of the arm, if one-eighth of this chord be set off on each side of the circle 1 4 9 and a portion of a circle having w for its center be drawn from the outer end of the arm through each point so set off and toward 12, these portions of circles will coincide with the outer and inner sides of the jet-pipe.

In practice the corners 13 and 14, Fig. 3, should be rounded off in the manner shown in Fig. 2.

In cases where the machine moves so fast as not to allow time for the water leaving it to fall a distance equal to the depth of the arm before the next arm comes up the water which leaves one arm will be struck by the other, and thus the machine will be in some measure retarded. When the machine moves at a speed slower than that of the arm, this defect may in most cases be remedied by simply turning the outer extremity of the jet-pipes a little outward, in order that the water which leaves one arm may be thrown outside of the other. The width of the jet-pipes in relation to that of the arms will be regulated by the velocity of the machine in relation to that of the water which works it. Thus if the machine moves at the same speed as the water the width of the outer end of each jet-pipe should be about one-third of the length of the chord subtending the arcs which determine the breadth of the arm.

The machine herein described should move at a speed about one-fourth slower than that of the water, and if the machine moves at about seven-eighths the speed of the water the chord which subtends the arcs which determine the breadth of the arm should be three and one-half times longer than the width of the jet-pipe.

The machine shown in Figs. 1, 2, and 3 is an improvement on the rotary machine to be worked by the pressure and reaction of a column of water, an English patent for which was granted to the said James Whitelaw, then of Glasgow, in the county of Lanark, North Britain, bearing date at Westminster the 7th day of May, 1839.

The new machine shown in Figs. 1, 2, and 3 more completely obviates the disadvantages of carrying the water round with the arms than the other machine now mentioned. This will be understood from what follows: Suppose, for the sake of illustration, that the center of the jet-pipes move at a speed as great as that of the water issuing from them. In this case the width of each jet-pipe will be about one-sixth of the width of the arm, its width being measured off on circular arcs in the manner hereinbefore mentioned. An arm of the kind represented in Fig. 3, if its dimensions be as last given, will contain about as much water as will fill a straight arm running from the center out to the jet-pipe if the area of the cross-section of the straight arm be uniform throughout its length and this area be six times greater than that of the jet-pipe. A straight arm having its cross-sectional area six times greater than that of its jet-pipe will in one revolution expend as much water as will fill the arm. The motion of the water through the arm being six times slower than its motion through the jet-pipe and the radius of a circle being to its circumference nearly as one is to six, the length of the arm will be to the circle described by the center of its jet-pipe in the same proportion; but the capacity of the curved arm being the same as that of the straight arm as much water as will fill the former will be the quantity required during one revolution of the machine. From this it is clear that the water which is leaving the center w at any instant when the arm is in the position shown in Fig. 3 will, after the arm has made one revolution, be out at 1, the beginning of the jet-pipe. The cross-sectional areas are so adapted to the curvature of the line 1 d l r w that whenever any point, as p, in the arm arrives at the point o in the radius w 1 the water which left the center when the arm was in the position shown in the figure will also have arrived at or near to the point o, and thus the water will flow from the center of the machine out to the jet-piece in a straight line, or nearly so, when the machine is in motion. When a jet-pipe moves at a speed slower than that of the water issuing from it, the arm may have a greater capacity than it would have if the motion of the jet-pipe were as great as that of the water without carrying the water round with it, for when the speed of the arm is reduced the speed of the water flowing through it may also be diminished.

The kind of arm shown in Figs. 1, 2, and 3 has a uniform depth throughout its length, and its cross-section at every point is of a rectangular form; but it will be evident that each cross-section of an arm and jet-pipe may be of a square, circular, or any other suitable form, provided the square, circular, or other form of arm has its cross-sectional areas at the corresponding distances from the center $w$ the same as the cross-sectional areas of the kind of arm shown in Figs. 1, 2, and 3.

Two circular plates set apart from each other at a distance equal to the depth of the arms, with curved division-plates between them to form the sides of the arms and jet-pieces, will form a convenient machine for many purposes, especially for working in tail-water, the main shaft being fastened to the center of the uppermost plate and the opening for the water being in the center of the undermost. If the arms or water-spaces are beyond a certain width, the innermost ends of the divisions fixed between the plates will terminate in a sharp end before they reach the central opening, and when this is the case in the space between the central opening and the inner ends of the division-pieces the top and bottom plates should be formed in such a manner as to allow the water to flow through that space at every point of its passage with the same or nearly the same degree of speed. This is accomplished by diminishing from the central opening out to the inner ends of the division-pieces the depth of the space which is between the top and bottom plates.

Fig. 5 is an elevation, mostly shown in section, and Fig. 6 is a plan showing this modification of the machine. $a\ a$ is part of the main shaft. The arms or passages for the water are marked $b\ b$, and $c$ is the central opening for the water. The portion of the top and bottom plates marked $e\ e$ (see Fig. 6) should in most cases be cut away in order to allow the water to fall at once after it escapes from the jet-pipes. Each plate, if so cut, will have the appearance of a circular saw with as many teeth in it as there are arms $b\ b$ in the machine for the passage of the water. The part cut away will be that marked $e\ e$, extending out from the dotted lines $e\ e$.

In Fig. 3 the spiral $1\ d\ l\ r\ w$ makes a complete revolution from the center outward, but the spiral running through the middle of an arm of the kind represented in this figure may make more than one revolution, or it may not make a whole revolution, provided a corresponding change be made in the width of the arm.

The nature of our improvement will be better understood by reference to Fig. 4, which represents a part of a hollow arm with its jet-piece and which is of the kind described in the specification of Letters Patent formerly granted to James Whitelaw in Great Britain, and hereinbefore referred to, and which was also in part described some years since in the *Journal of the Franklin Institute*. It is not our intention to claim nor do we now claim an arm so constructed as constituting any part of our present invention. In the arm as represented in this figure the spiral running through the middle of it would make a complete revolution, and upon the principles herein laid down the area of its cross-section at any part of it, excepting at or near to the jet-piece $a\ a$, would be six times as great as that of said jet-piece, its sides being parallel to each other, or nearly so, whether made circular, square, or in any other form.

Our improvement in these arms for which we claim Letters Patent consists in our making them to diminish regularly in the capacity of their cross-sections in such a manner as that the area of such sections shall correspond with the velocity due to the water in its passage from the point at which it enters the arms to that at which it escapes therefrom, the same being calculated and graduated upon the principles herein fully made known.

The advantages of this mode of construction are that no portion of the effluent water will be carried round by the centrifugal action of the arms to an injurious extent, the whole being rendered efficient in the production of propelling-power. It will be manifest, however, that although a near approximation may be made to the attainment of the proposed end it is not possible in the nature of things to arrive at absolute precision in the mechanical construction of the hollow arm, and that some variation may also be admitted without sensibly changing the result. It will be seen, for example, that for some small distance from the center of motion the velocity of revolution will be comparatively slow, and consequently the cross-sectional areas of the arms may for such limited distance be equal. We do not intend, therefore, to limit our claim to such structures only as shall present the utmost attainable precision, but to embrace therein such hollow arms or apertures as are formed upon the principles herein fully made known, and the action of which, in consequence of such formation, is substantially the same in its results with that herein described.

Having now particularly described our said improvements in rotary machines to be worked by water and the manner of their operation, we declare that we do not claim any of the parts hereinbefore described which are old or known separately, nor otherwise than and insofar as the same are newly combined, modified, adjusted, and arranged.

JAMES WHITELAW.
JAS. STIRRAT.

Witnesses:
JOHN CAMPBELL,
DOUGALD TURNER.